INVENTOR
RICHARD M. OMAN
BY Charles A. Johnson
ATTORNEY

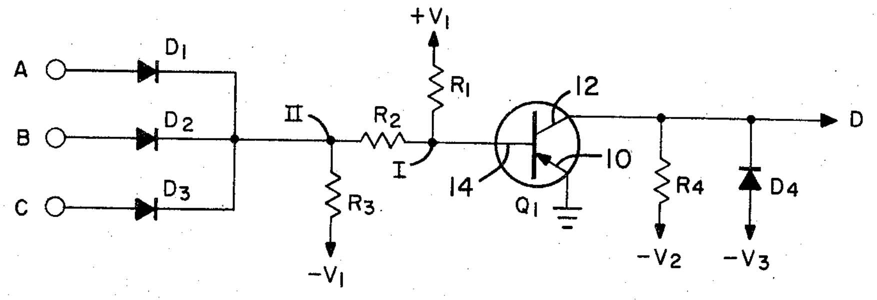
Fig. 2
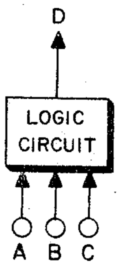
Fig. 3
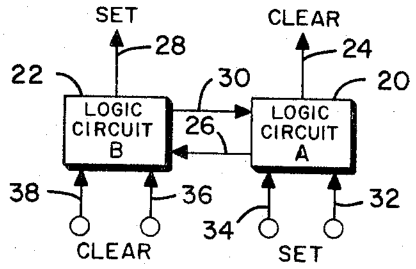
Fig. 5
| D | A | B | C |
|---|---|---|---|
| 1 | 0 | 0 | 0 |
| 0 | 0 | 0 | 1 |
| 0 | 0 | 1 | 0 |
| 0 | 0 | 1 | 1 |
| 0 | 1 | 0 | 0 |
| 0 | 1 | 0 | 1 |
| 0 | 1 | 1 | 0 |
| 0 | 1 | 1 | 1 |
Fig. 4a
H = HIGH
= 0 VOLTS
= LOGICAL 1
L = LOW
= −3 VOLTS
= LOGICAL 0
| D | A | B | C |
|---|---|---|---|
| H | L | L | L |
| L | L | L | H |
| L | L | H | L |
| L | L | H | H |
| L | H | L | L |
| L | H | L | H |
| L | H | H | L |
| L | H | H | H |
Fig. 4b
INVENTOR
RICHARD M. OMAN
BY Charles A. Johnson
ATTORNEY INVENTOR
RICHARD M. OMAN
BY Charles A. Johnson
ATTORNEY United States Patent Office 3,350,579
Patented Oct. 31, 1967

3,350,579
n-STATE CONTROL CIRCUIT

Richard M. Oman, Roseville, Minn., assignor to Sperry Rand Corporation, New York, N.Y., a corporation of Delaware Filed June 25, 1965, Ser. No. 466,964
14 Claims. (Cl. 307—88.5)

ABSTRACT OF THE DISCLOSURE

An *n*-state control circuit, such as could be used for a frequency divider, comprised of *n*-stages is described. Each stage includes an indicating circuit and a temporary storage circuit. The output signal from each indicating circuit is coupled as an input signal to all subsequently ordered indicating circuits and to its associated storage circuit. Each indicating circuit receives input signals from all other storage circuits, except the next preceding one. A source of advance pulses is coupled to each of the storage circuits for providing time space signals causing one of the storage circuits to switch its associated indicating circuit to the indicating state when the preceding indicating circuit was in the indicating state, and for causing such preceding indicating circuit to be switched to the non-indicating state.

This invention relates generally to pulse responsive apparatus. More particularly, it relates to pulse counter systems of the type which utilizes a plurality of similar logic circuits and including between each stage a temporary storage device for simultaneously trapping the advance pulse, clearing the preceding state, and setting the subsequent stage.

In many digital computing systems, it is often desired to produce a specified output signal at a frequency which bears a predetermined relationship to the repetition rate of the pulses which are applied to the input terminals of the counting system. The frequency of the output signal thus produced most commonly is referred to as a submultiple of the frequency of the input pulses. Where frequency reduction by powers of two is required, as is often necessary in conventional binary counting systems, efficient frequency division is accomplished by utilizing conventional bistable multivibrators, otherwise known as flip-flops. Such counters produce a single output pulse whenever a number of advance pulses equal to some power of two are applied to the input terminals of the circuit. The particular power of two depends upon the number of individual bistable stages which are cascaded to form the completed counting circuit. Therefore, when a single bistable flip-flop is used as a frequency divider, an output frequency of one-half the input frequency is produced. Similarly, when two cascaded flip-flops are employed, the output frequency equals one-fourth the value of the input frequency. These power-of-two systems can be expanded as far as needed to produce the requisite frequency division.

In present day digital computing systems, it is often desired to accomplish frequency division in powers other than two. In such a system, the usual type of flip-flop multivibrator circuit requires modification from the binary operation referred above in order to produce an output pulse in response to the number of input pulses unrelated to successive powers of two. The additional circuitry required for modification of such circuits raises the cost of the circuit, and reduces the reliability due to the number of additional components required.

In frequency dividers and counters readily available in the prior art, strict limitations are normally placed on the parameters of the input pulses. Often the time relationship of the occurrence of the input pulses must be closely regulated in order to assure proper operation of the circuit.

In the present invention, there is provided an inexpensive and simply constructed frequency dividing circuit in which the additional components and expense required for the utilization of standard flip-flop frequency division circuitry for powers other than powers of two are avoided. Further, by utilizing unique control circuitry associated with each stage of the unit, the strict requirements of input pulse duration, pulse repetition frequency, and pulse shape set forth in the requirements in the prior art, are virtually eliminated.

The circuit of the present invention also lends itself ideally for use as a counting circuit. Another use of the disclosed circuit is as a multistable state storage element.

The primary object, therefore, of this invention is to provide an improved electronic control circuit.

It is a further object of this invention to provide an improved frequency divider circuit.

It is a still further object of this invention to provide an asynchronously operable timing circuit using control circuitry in conjunction with the output indicating circuitry.

Yet another object of this invention is to provide an *n*-stable device including control circuitry for unambiguously in an orderly manner changing the indicating state of the *n*-stable state device upon the application of a single control signal.

It is still a further object of this invention to provide an improved counting circuit in which the duration of each input pulse is not critical in the operation of the counting circuit.

A still further object of this invention is to construct an improved control circuit from a plurality of similar logic circuits.

Other objects and advantages of this invention will be discussed in the course of the following specification, reference being had to the accompanying drawings, in which:

FIG. 2 is a schematic diagram of the two-state basic building block circuit utilized in describing one embodiment of this invention;

FIG. 3 is a logic block symbol of the circuit illustrated in FIG. 2;

Figure 6:
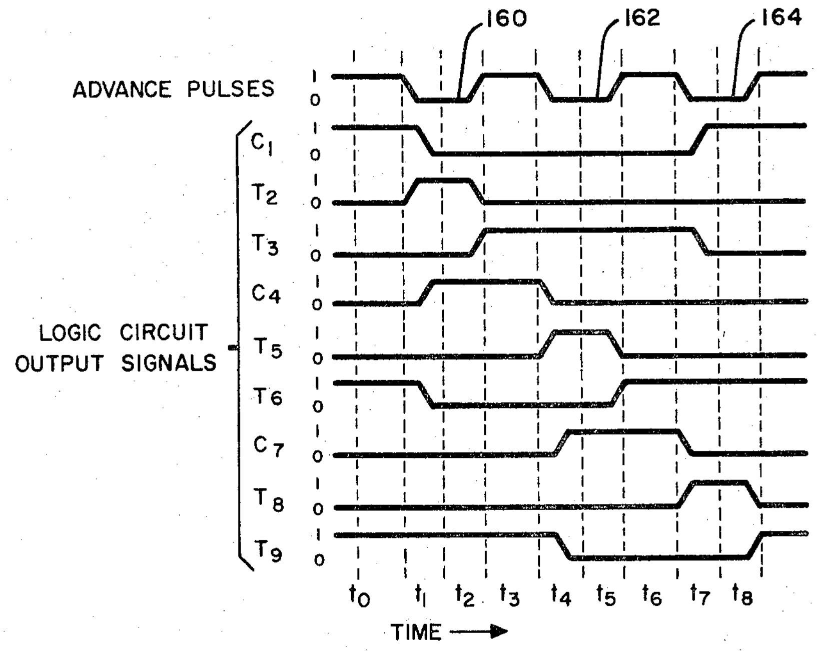
Figure 7:
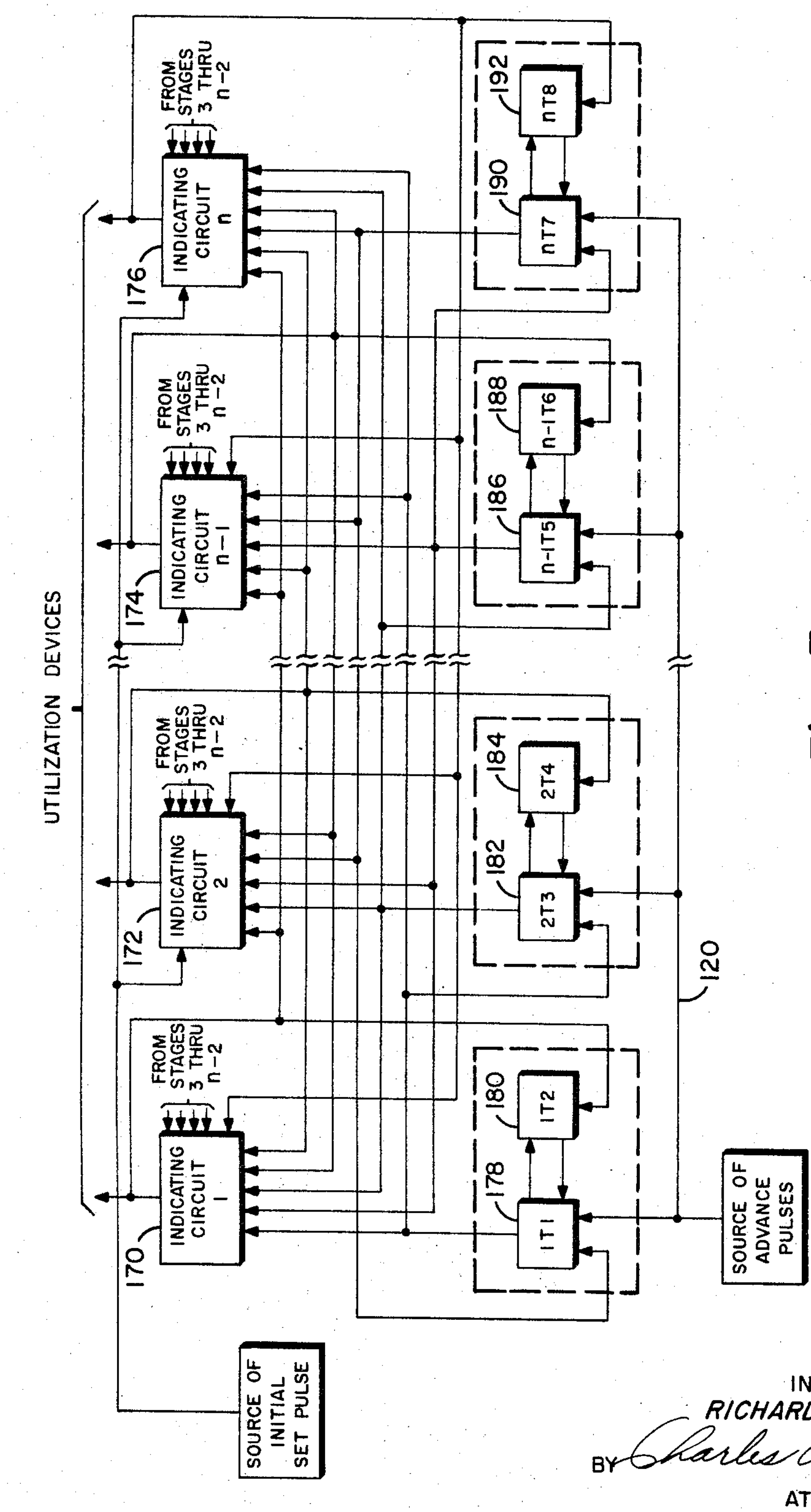

FIGS. 4*a* and 4*b* are truth-tables defining the operation of the circuit shown in FIG. 2;

FIG. 5 illustrates a bistable arrangement of two logic circuits of the type illustrated in FIG. 2 comprising a cross-coupled bistable flip-flop;

FIG. 6 is a signal diagram illustrating the relationship of the output signals of the respective circuit elements in response to the application of each time-spaced pulse; and FIG. 7 is a block diagram of an *n*-stage counting circuit constructed in accordance with this invention.

At the outset, the basic two-state logic circuit which is utilized as a building block to construct the bistable stages of the asynchronous counting circuit and the bistable control elements will be explained. By utilizing interchangeable building block circuits for performing the logic operations, the logic of the counting and control circuitry can be understood and simplified by a block logic diagram discussion rather than necessitating the consideration of each detail circuit component. For illustrative purposes for this embodiment, the binary logic can be considered as having two signal values for representing binary one and binary zero. Since the circuit has two operative states, conducting and non-conducting, it is termed a two-state logic circuit. Of course, two levels of conduction could equally as well be used. In this case, a high level is represented by zero volts and is utilized to indicate a logical 1 signal. A low value is represented by −3 volts and is used to indicate a logical 0. The manner in which the circuit in FIG. 2 operates on input signals to provide output signals is illustrated in FIG. 4*a* and FIG. 4*b*. It can be seen that to provide a logical 1 output signal (high), it is necessary that all input signals be low (logical 0). In a similar manner, it can be seen that a low (logical 0) output signal will be developed if any or all of the input signals are of the high (logical 1) state.

Turning now to a brief description of the circuit operation of the building block shown in FIG. 2, it can be seen that three input terminals labeled A, B and C are illustrated. This is illustrative only and limitation thereto is in no way intended. The number of input terminals can vary from one, which would result in the circuit operating as a simple inverter, on upward within the circuit fan-in limits. Transistor Q1, which is illustrated of the PNP type, has three electrodes namely the emitter 10, the collector 12, and the base 14. For this embodiment, the emitter is coupled to ground and the collector is coupled to output terminal D. This collector circuit can be termed the output circuit. A voltage divider network comprised of resistors R1, R2, and R3 is coupled between voltage sources $+V_1$ and $-V_1$. The base electrode 14 is coupled to the bias-network junction labeled I intermediate resistors R1 and R2. The voltage divider network can be termed a bias network, and the base circuit can be termed the control electrode. The collector 12 is coupled to one end of resistor R4, with the other terminal of resistor R4 being coupled to voltage supply $-V_2$. Also coupled to the collector is one terminal of voltage limiting diode D4. The other terminal of D4 is coupled to voltage $-V_3$ and operates the clamp to the output signal. For this illustration, a low signal has been shown as −3 volts, and is the value of supply $-V_3$. Diodes D1, D2 and D3 have their anodes respectively coupled to input terminals A, B, and C. The cathode terminals of diodes of D1, D2, and D3 are coupled to the common point which in turn is coupled to point II intermediate resistors R2 and R3. The values of resistors in the voltage divider network R1, R2 and R3 are chosen so that point I causes the base of the transistor Q1 to be biased such that the transistor is in the turned-off or non-conducting state. This divider network puts a reverse bias on the emitter-base junction. The voltage level at the base when the transistor is turned-off is at, or slightly positive with respect to, the potential applied to the emitter 10. With the transistor turned-off, the signal applied at output terminal D is the value $-V_3$, or for this embodiment −3 volts. A high (ground) signal on any of the input terminals A, B, or C raises point II to nearly ground level since the forward voltage drop across unidirectional conducting diodes is very small. A low signal (−3 volts) on each input terminal A, B, and C causes point II to be lowered to approximately −3 volts. This operates to cause point I to be brought below ground level, and forward biases transistor Q1 in a manner to cause it to conduct. When transistor Q1 is caused to conduct, a minimal voltage drop is detected across the emitter-collector circuit and output terminal D provides approximately ground potential, or a logical 1. For purposes of the foregoing discussion, leakage currents in Q1 are ignored. In summary, then, it can be seen that if any signal applied to input terminals A, B, or C is of a high level, the output level will be low; and, that only when all input signals are low will the output signal be high. When the circuit is coupled into a logic array, output terminals of each building block such as D will be coupled directly to the input terminal of another similar circuit. The values of R1, R2, R3, and R4 will be dependent upon the selection of the voltage values $+V_1$, $-V_1$, $-V_2$ and $-V_3$, hence specific examples will not be given, it being understood that the values are being selected to operate in the manner described above in conjunction with the selective voltage sources.

The term NOR circuit is often used in the computer arts, and can be defined as a circuit which provides an output signal only when all the input signals are absent. Considering the logical 1 and logical 0 designations of FIG. 4*a*, it can be seen that a logical 1 is provided only when all the input signals are logical 0. It can be said, then, that the circuit of FIG. 2 fulfills the terms of the definition and can be considered as a NOR circuit. This can also be termed a positive OR-inverter, since any high (positive) pulse will cause a low, or inverted output signal. It can be understood that other circuits, such as negative OR-inverter circuits, or circuits referred to as NAND circuits, can also be utilized to embody this invention, it being only necessary to reverse definitions of logical 1 and logical 0. It should be understood further that though a PNP resistor is illustrated for a logical building block, an NPN transistor could equally as well be utilized with the appropriate adjustments of bias and voltage levels.

The circuit described in FIG. 2 can be represented as a block designated Logic Circuit, having a plurality of inputs A, B, and C and a single output terminal D, as shown in FIG. 3. It should be understood that terminal D can be coupled to a plurality of related input terminals. It should be understood further, as stated above, that the number of input circuits can vary from one to *n* within the fan-in- limits of the circuitry.

FIG. 5 illustrates a bistable flip-flop comprised of a pair of circuits of the type described in FIG. 2. These circuits are illustrated by logic circuit A labeled 20, and logic circuit B, labeled 22. Block 20 has an output terminal 24, which, for purposes of this description, is termed the Clear output terminal. Circuit 20 also provides on wire 26 an input signal to circuit 22. Circuit 22 has an output terminal 28 which is termed the Set output terminal. Circuit 22 also provides an input signal to circuit 20 via wire 30, thereby describing the cross-coupled flip-flop arrangement. Additionally, circuit 20 has input terminals 32 and 34. Again only three inputs are shown for each circuit, but limitation thereto is in no way intended. Circuit 22 in a similar manner has input terminals 36 and 38. In operation, it will be seen that a high signal on either input terminals 32 or 34, termed the Set input terminals, will cause the output terminal of circuit 20 to exhibit a low signal. Normally a limitation is placed on flip-flop circuits that a high signal cannot be applied simultaneously to both the Clear and Set sides. This is not the situation with the transfer-trap flip-flop, and it will be noted in the discussion below that high signals are applied to both the Set and Clear sides. However, one of the high signals will be terminated first, hence, the flip-flop will be put in the state indicated by the remaining high signal. The low output signal from circuit 20 will be applied via wire 26 as an input signal to circuit 22. As just stated, terminals 36 and 38 will be maintained at the low level. Referring back to the truth table of FIG. 4*b*, it can be seen that when all input signals are low, the output signal is high. Therefore circuit 22 will provide to output terminal 28 a high or Set signal. To clear the flip-flop, it is necessary to apply a high signal on either of the Clear terminals 36 or 38. A high signal on either of these terminals will cause the output terminal 28 to assume the low condition and will cause a low signal to be applied via wire 30 as an input signal to circuit 20. As stated above, the flip-flop can have simultaneously applied thereto Clear and Set pulses, hence when terminals 32 and 34 have low signals impressed thereon, circuit 20 will be caused to provide a high signal to the Clear output terminal 24.

Having described the normal modes of operation of the two-state building block logic circuit utilized to implement this embodiment, a consideration of the asynchronous control circuit will now be made, with particular attention being directed to FIG. 1. This embodiment illustrates three indicating stages comprised of circuit C1, labeled 100; circuit C4, labeled 102; and circuit C7, labeled 104. Additionally, each indicating stage has associated therewith a transfer-trap flip-flop. These transfer-trap flip-flops are respectively comprised of cross-coupled logic circuit that operate as described above. The first stage flip-flop includes circuit T2, labeled 106, and circuit T3, labeled 108; the second flip-flop includes circuit T5, labeled 110, and circuit T6, labeled 112; and the third flip-flop includes circuit T8, labeled 114, and circuit T9, labeled 116. A Source of Advance Pulses 118 provides time-spaced advance pulses for causing the operating state of the control circuit to cause the indicating state of its stages to sequentially switch around the loop. The Source of Advance Pulses 118 provides the time-spaced advance pulses on bus 120, which in turn is coupled to an input terminal of one of the circuits in the respective transfer-trap flip-flops. This is illustrated by conductor 122 being coupled to an input circuit of circuit T2, conductor 124 coupled to an input circuit of circuit T5, and conductor 126 being coupled to an input circuit of circuit T8. For those configurations where more than three indicating stages are required, the transfer-trap flip-flops associated with the higher ordered indicating circuits would receive advance pulses in a manner similar to that just described.

Each of the indicating circuits C1, C4, and C7 can supply an associated utilization device as desired. The output signal from circuit C1 is provided on conductor 128; the output signal from circuit C4 is provided on conductor 130; and the output signal from circuit C7 is provided on conductor 132. One utilization device 134 is illustrated, it being understood that each of the indicating stages can supply an associated utilization device. For this embodiment, wherein three indicating stages are utilized, it can be seen that three advance pulses will be required before an output pulse will be available on conductor 132 as an input to utilization device 134. It is of course evident that useful output signals can be derived from any or all of the indicating circuits C1, C4, or C7.

Each of the transfer-trap flip-flops includes the cross-coupling conductors for the respective logic circuits. In the first stage circuits T2 and T3 have cross-coupling conductors 136 and 138; the second stage transfer-trap flip-flop comprised of circuits T5 and T6 have cross-coupling conductors 140 and 142; and the third stage transfer-trap flip-flop comprised of circuits T8 and T9 has cross-coupling conductors 144 and 146. These flip-flops operate in the manner described above in association with FIG. 5.

The output signals from each of the indicating circuits C1, C4, and C7 are applied as input signals respectively to each of the other indicating circuits thus allowing one and only one indicating circuit to have a high output, and as control signals to their respectively associated transfer-trap flip-flops. These connections are illustrated where the output signal from indicating circuit C1 is applied as an input signal to indicating circuit C4 via wire **128*a*; as an input signal to indicating circuit C7 via conductor 128*b*; and as a control signal to its associated transfer-trap flip-flop, the signal being directed to circuit T3 via conductor 128*c*. Indicating circuit C4 provides its output signal as input signals to indicating circuit C1 via conductor 130*a*; to indicating circuit C7 via conductor 130*b*; and to its associated transfer-trap flip-flop circuit T6 via conductor 130*c*. Finally, indicating circuit C7 provides its output signal as an input signal to indicating circuit C1 via conductor 132*a*; to indicating circuit C4, via conductor 132*b*; and to its associated transfer-trap flip-flop circuit T9 via conductor 132*c***.

Each of the transfer-trap flip-flops provides an output signal to its associated indicating circuit, to the next subsequent transfer-trap flip-flop, and to all other indicating circuits in the control circuit with the exception of the next subsequent indicating circuit. The output signal from the first stage transfer-trap flip-flop circuit T2 is applied via conductor 148 to a distribution point where it is provided as an input signal to indicating circuit C1 on conductor **148*a*; to the indicating circuit C7 on conductor 148*b*; and as a control signal to the next subsequent stage transfer-trap flip-flop circuit T5 on conductor 148*c*. In a similar manner the output from the second stage transfer-trap flip-flop T5 is provided on conductor 150 to a distribution point where the signals are directed to the C1 indicating circuit on conductor 150*a*; to the C4 indicating circuit on conductor 150*b*; and to the next subsequent transfer-trap circuit T8 on conductor 150*c*. Finally, the output signal from the third stage transfer-trap flip-flop circuit T8 is provided on conductor 152 to a distribution point where it is fed as an input signal to indicating circuit C7 on conductor 152*a*; as an input signal to indicating circuit C4 on conductor 152*b*; and as a control input to the first stage transfer-trap flip-flop circuit T2 on conductor 152*c***.

In addition to the input signals previously described in this case, circuits C4 and C7 of the first stage are provided with an additional input from a Source of Initial Set Pulses 154 on bus 156 via conductors **156*a* and 156*b* respectively. This source of input pulses is provided to cause the indicating circuit of stage one circuit C1 to be switched in the indicating state prior to initiating the operation of the Source of Advance Pulses 118** for providing the time-spaced advance pulses which control the stepping of the control circuit. Circuit C1 will be switched to the high output state, if a high input signal is applied to C4 and C7, thereby causing them to exhibit a low output signal. This follows since the initial Set high signal will force C4 and C7 to provide low output signals. At the time indicating circuit C1 is set in the indicating state, all the other indicating circuits in the control circuit are in the non-indicating state.

Figure 1:
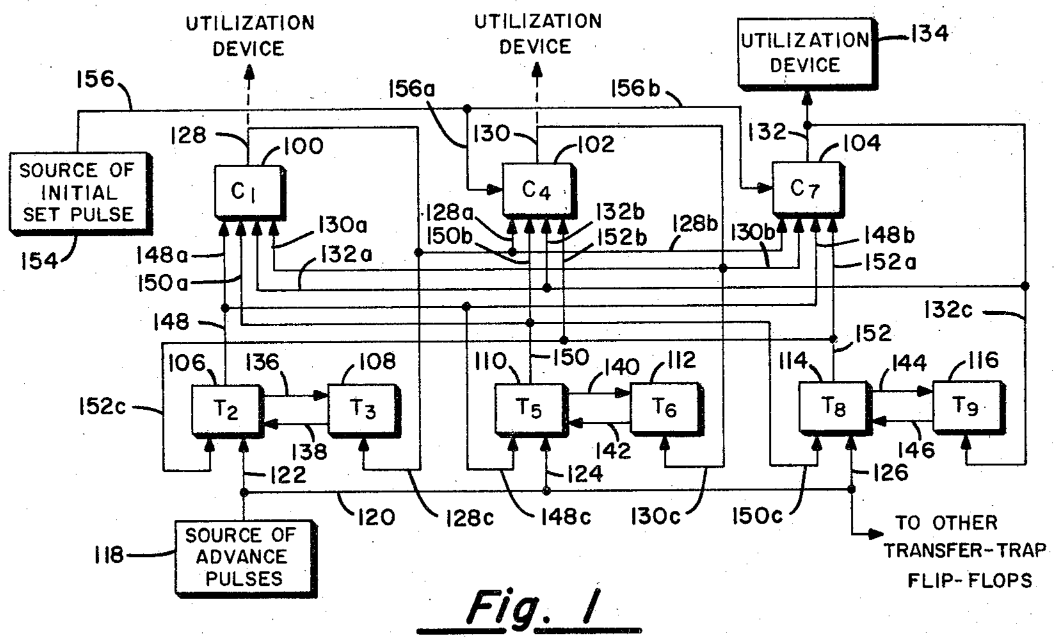
FIG. 1 is a schematic block diagram of the three-stage counting circuit constructed in accordance with the concepts of this invention.

FIG. 6 shows a timing diagram which illustrates the relationship of the advance pulses to the various output signals from the logic circuits which comprise the asynchronous control circuit illustrated in FIG. 1. The timing diagrams are somewhat idealized and the rise and fall times of the pulses are somewhat exaggerated so that the relationship of the various signals can more readily be understood. It will be noted that there is no time scale. This follows because the operation of the asynchronous circuit, as the name implies, is not limited to a time-spaced relationship of pulses, and the speed of operation is only limited by the inherent delays of the circuitry employed and the time sequence of the occurrence of the advance pulses. The advance pulses illustrated are shown occurring uniformly in time, that is at fixed time-spaced intervals. It should be noted that the next subsequent advance pulse can come as soon or as long after an advance pulse as may be desired for the particular control function, and that the operation of the transfer-trap flip-flops will be to recall the status of the control circuit and to generate the advance of the indicating stage when the next advance pulse is received. It has been stated that the maximum repetition frequency of the occurrence of the advance pulses is limited only by the switching delay of the particular circuits being utilized. This can be seen from the following consideration. If it is assumed that the average delay through one of the circuits of the type described in FIG. 2 is a time factor $d$, and if it is assumed for instance considering the center stage in the control circuit, that the advance pulse is applied to T5 it can be seen that upon the occurrences of an advance pulse there will be a first timing delay $d$ as the signal propagates through circuit T5 and a second time delay $d$ as the signal propagates through indicating circuit C4. This causes a utilization device to feel the effect of an advance pulse within two circuit delay times. A third delay time $d$ is required to propagate through the other circuit of the transfer-trap flip-flop (T6) and again through circuit T5 to enable the pulse to be advanced to the next indicating state. This gives a minimum of four circuit delay periods which must be provided between subsequent applications of advance pulses.

The operation of the circuit shown in FIG. 1 will be described with attention being directed to the signals shown in FIG. 6. For this discussion it is assumed that at the outset any one of the indicating circuits C1, C4, and C7 is in the indicating state. An initial set pulse (high) is applied to indicating circuits C4 and C7 to cause them to provide low output signals and to drive C1 into the indicating state, that is, providing a high or logical one signal on its output terminal 128. FIG. 6 illustrates the condition of the output signals for each of the logical circuits in the asynchronous control circuit after indicating circuit C1 has initially been set. The initial condition is indicated along dashed line $t_0$. Table I can be correlated to FIG. 6 and lists each of the two-state logic circuits in the three-stage asynchronous control circuit of FIG. 1, and illustrates the logical output signal from each circuit as each of three advance pulses are applied and removed. It will be noted in the first column of Table I that the initial condition of indicating circuit C1 is in the indicating or logical 1 condition, as shown by the "1" enclosed in the dashed block. The time between the setting of the initial condition and the application of the first advance pulse can be indeterminate. In FIG. 6 the advance pulses are shown occurring in a uniform time-spaced relationship, but it should be understood that the time between advance pulse one, labeled 160, and the second advance pulse, labeled 162, there is a time-space $t_3$ which may vary in duration as desired. Similarly, the time between the second advance pulse 162 and the third advance pulse, labeled 164, is a period designated $t_6$, and as previously stated may be any time duration desired. The showing of the uniformly occurring time-spaced advance pulses of uniform duration is merely illustrative operating situation.

is provided as an input signal via conductor 148*a* to indicating circuit C1. From an examination of the truth table of FIG. 4*a*, it can be seen that when any input signal is logical 1, the output signal of the circuit will be logical 0. Therefore the logical 1 input signal causes indicating circuit C1 to switch the output signal on conductor 128 to the non-indicating (logical 0) state. The logical 0 output signal from indicating circuit C1 is applied as an input signal via conductor 128*a* to indicating circuit C4. The logical 1 output signal from circuit T2 is applied as an input signal via conductor 148*b* to indicating circuit C7 and arbitrarily causes output signal from C7 on conductor 132 to be held at the logical 0 level. The output signal from circuit T2 is also applied as a control input signal to the stage-two transfer-trap circuit T5 via conductor 148*c*, and causes the output signal on conductor 150 to be a logical 0. This logical 0 signal derived from circuit T5 is applied as an input signal to indicating circuit C4 on conductor 150*b*. From the foregoing it can be seen that all of the input signals to indicating circuit C4 are now a logical 0, thereby causing it to provide a logical 1 (indicating) output on conductor 130. This is indicated in the second column of Table I and in FIG. 6 during the time interval designated $t_1$. When the advance pulse 160 is removed, as indicated by time interval $t_2$ in FIG. 6, it can be seen that control circuitry adjusts and that circuit T2 goes from the logical 1 to the logical 0 operating condition and circuit T3 goes from the logical 0 to the logical 1 operating condition. All other circuits remain unaltered. It should be noted specifically that the indicating output signal from indicating circuit C4, as shown by dashed block in Table I in the $t_1$ and $t_2$ columns remains in the indicating (logical 1) state. It should be noted further that the output signals from indicating circuit C1 and indicating circuit C7 are in the non-indicating or logical 0 state. As stated above, the time interval $t_3$ may be of any duration desired for the operation of the circuit.

TABLE I

| Logic Circuit | Output Signals | | | | | | |
|---|---|---|---|---|---|---|---|
| | Initial Condition ($t_0$) | Apply Advance Pulse #1 ($t_1$) | Remove Advance Pulse #1 ($t_2$) | Apply Advance Pulse #2 ($t_4$) | Remove Advance Pulse #2 ($t_5$) | Apply Advance Pulse #3 ($t_7$) | Remove Advance Pulse #3 ($t_8$) |
| C1 | 1 | 0 | 0 | 0 | 0 | 1 | 1 |
| T2 | 0 | 1 | 0 | 0 | 0 | 0 | 0 |
| T3 | 0 | 0 | 1 | 1 | 1 | 0 | 0 |
| C4 | 0 | 1 | 1 | 0 | 0 | 0 | 0 |
| T5 | 0 | 0 | 0 | 1 | 0 | 0 | 0 |
| T6 | 1 | 0 | 0 | 0 | 1 | 1 | 1 |
| C7 | 0 | 0 | 0 | 1 | 1 | 0 | 0 |
| T8 | 0 | 0 | 0 | 0 | 0 | 1 | 0 |
| T9 | 1 | 1 | 1 | 0 | 0 | 0 | 1 |

The following discussion will trace the circuit operation of the arrangement illustrated in FIG. 1 through one complete counting cycle including the application of three advance pulses such as 160, 162, and 164. When the Source of Advance Pulse 118 provides the first advance pulse on bus 120 which in turn applies the advance pulse 160 as input signals to circuits T2, T5, and T8, a logical 1 signal is applied as an output signal from circuit T2 on conductor 148. This output signal of logical 1 from circuit T2 results from the situation that the other input signals to T2, as shown in the Initial Condition column of Table I, are logical zeros. The logical 1 output from circuit T2

Upon a subsequent application of the second advance pulse 162, it will be seen that all inputs signals to circuit T5 are logical 0, hence its output signal will be a logical 1. A logical 1 signal on conductor 150 will be applied as an input signal via conductor 150*b* to indicating circuit C4, and will cause the output signal on conductor 130 to be a logical 0 or non-indicating. In a similar manner, the logical 1 signal on conductor 150 will be applied via conductor 150*a* as an input signal to indicating circuit C1 and will cause its output signal to be held as a logical 0. The output signal from circuit T5 is applied via conductor 150*c* as a control input signal to circuit T8 thereby causing a logical 0 output signal on conductor 152. This output signal from circuit T8 is applied via conductor 152 as an input to indicating circuit C7. Indicating circuit C4 having been switched to the logical state, a logical 0 is applied via conductor 130*b* as an input signal to indicating circuit C7. The logical 0 output signal from circuit T2 is applied via conductor 148*b* as an input signal to indicating circuit C7. Finally, the output signal from indicating circuit C1 is a logical 0 and is applied via conductor 128*b* as an input signal to indicating circuit C7. Therefore, it can be seen that all of the input signals to indicating circuit C7 are logical 0, hence the output signal will be a logical 1. Again, referring to Table I it will be noted that the removal of the second advance pulse does not alter the indicating state of any of the indicating circuits C1, C4, or C7. It only operates to adjust the operating condition of the second stage transfer-trap flip-flop comprising circuit T5 and circuit T6. The time interval T6 during which the advance pulse is held off, again may be of any time duration desired.

Upon the application of the third advance pulse 164 during time interval $t_7$ it will be seen that in a similar manner the indicating state of the previously indicating circuit C7 is switched to the non-indicating state and that the indicating state of C1 is changed from the non-indicating to the indicating (logical 1) state. Upon the application of the third advance pulse 164 all input signals to the third stage transfer-trap circuit T8 will be logical 0, hence its output signal on conductor 152 will be a logical 1. This logical 1 signal is applied as an input signal via conductor 152*a* to indicating circuit C7 and causes its operating condition to be switched from the indicating to the non-indicating state. During this time interval $t_7$, all input signals to indicating circuit C1 are changed to the logical 0 level hence causing it to provide an indicating (logical 1) signal on conductor 128. As previously stated, the removal of the advance pulse does not alter the operation of any of the indicating circuits, and it will be seen that indicating circuit C1 remains in the indicating state, as indicated by the signals enclosed in the dashed block in Table I in columns $t_7$ and $t_8$. The only alteration of the operating condition of any of the circuits are in the adjustment of the output signals of the third stage transfer-trap flip-flop comprised of circuits T8 and T9.

A consideration of the output signals available from circuits T3, T6, and T9, as shown in Table I and graphically in FIG. 6, indicates that the respective output signals are held low (logical 0) until the associated advance pulse has returned high. It should be noted that these output signals can be applied to circuitry other than that shown for providing control functions. A further examination of Table I and FIG. 6 with attention directed to the output signals derived from circuits T2, T5, and T8, indicates that these signals are in fact inverted advance pulses divided in frequency by the number of stages of the device. In this illustrative case, the signals are at one-third the frequency of the advance pulses. In a manner similar to that just described, the output terminals of circuits T2, T5, and T8 can be coupled to circuitry not shown for providing control signals thereto.

It is readily apparent that the circuit illustrated can be replaced with an equivalent logical circuit having a logical operation of the inverse of that described above, and that for such a situation it is necessary only to redefine the voltage levels that are to indicate logical 1 and logical 0 respectively.

The operation described above in the consideration of FIG. 1 will continue to cycle to the indicating state of one of the indicating circuits around the loop exactly as described above when additional advance pulses are applied. Therefore, it can be seen that if the device is used as a frequency divider that for every three advance pulses applied to advance pulse bus 120 there will be an indicating circuit applied on conductor 132 to a utilization on device 134.

Having considered the specific three-stage asynchronous control circuit comprised of two-state logic circuits in accordance with this invention, attention is directed to FIG. 7 which illustrates an *n*-stage asynchronous control circuit which operates in a manner identical to that described above. It can be seen that there are *n*-indicating circuits, illustrated as Indicating Circuit 1, labeled 170; Indicating Circuit 2, labeled 172; Indicating Circuit *n*–1, labeled 174; and Indicating Circuit *n*, labeled 176. For this example, *n* is an integer greater than one. Each indicating circuit has associated therewith a transfer-trap flip-flop comprised of a pair of two-stage logic circuits. For Indicating Circuit 1, the transfer-trap flip-flop is comprised of circuit 1T1, labeled 178, and circuit 1T2 labeled 180. The transfer-trap flip-flop for Indicating Circuit 2 is comprised of circuit 2T3, labeled 182, and circuit 2T4, labeled 184. For the Indicating Circuit *n*–1, the transfer-trap flip-flop is comprised of circuit *n*–1T5, labeled 186, and *n*–1T6, labeled 188. Finally, the *n*th Indicating Circuit has associated therewith the *n*th transfer-trap flip-flop comprised of circuits *n*T7, labeled 190, and circuit *n*T8, labeled 192. Each of the transfer-trap flip-flops are cross-coupled in a manner similar to that described above. The Source of Advance Pulse 118 is coupled to bus 120 which in turn provides the source of advance pulses to each of the transfer-trap flip-flops just described. Each of the transfer-trap flip-flop circuits repectively provides an input signal to its associated indicating circuit; to the next subsequent transfer-trap flip-flop; and to each of the other indicating circuits in the circuit arrangement with the exception of the next subsequent indicating circuit. Each of the indicating circuits provides an output signal which is utilized as an input signal for all indicating circuits in the asynchronous control arrangement. This is shown by the line connections, and the dashed line input lines from other stages not illustrated. Additionally, each indicating circuit provides its output signal as an input signal to its associated transfer-trap flip-flop. The foregoing connections are made exactly as shown in FIG. 1, and the operation is identical therewith, the only difference being in the number of input signals applied to each of the indicating circuits. The number of input signals to each of the transfer-trap flip-flop circuits remains the same. Since the operation of the individual indicating circuits upon the application of the individual advance pulses is identical, further detailed description of the circuit outputs for the *n*-stage asynchronous control circuit is not deemed necessary.

From the foregoing it is apparent that the various purposes and objectives of this invention have been achieved, and have been described in detail. It is understood that suitable modifications may be made in the structure as disclosed provided such modifications come within the spirit and scope of the appended claims. Having now, therefore, fully illustrated and described the invention, what is claimed to be new and desired to protect by Letters Patent is defined in the appended claims.

What is claimed is:

1. An *n*-stage control circuit, each stage capable of alternatively generating indicating and non-indicating output signals, the circuit operating at any given time so that only one of the *n*-stages generates an indicating signal and all other stages generate non-indicating signals, said circuit comprising:

*n* two-state indicating circuits, where *n* is an integer greater than one, said indicating circuits being arranged in sequential order to form *n*-indicating stages, each of said indicating circuits having multiple-circuit output connections and multiple-circuit input connections, each of said indicating circuits having an output connection coupled to an input circuit of all other ones of said indicating circuits;

*n* transfer-trap circuits, each of said transfer-trap circuits respectively associated with a different one of said *n* indicating circuits, each of said transfer-trap circuits coupled to input circuits of all except the next sequential indicating circuit, and each of said tranfsfer-trap circuits coupled to an input circuit of the next sequential transfer-trap circuit, each of said transfer-trap circuits having an input circuit coupled to the output circuit of its associated indicating circuit, and each of said transfer-trap circuits including an advance input terminal for receiving time-spaced advance pulses for causing one of said transfer-trap circuits to switch the indicating state of its associated indicating circuit when the preceding stage indicating circuit was in the indicating state and for causing the previous indicating circuits to be switched to the non-indicating state.

2. An $n$-stage signal stepping circuit, each stage capable of alternatively generating indicating and non-indicating signals, the circuit operating at any given time so that only one of the $n$-stages generates an indicating signal and all other stages generate non-indicating signals, said circuit comprising:

$n$ two-state logic circuits arranged in sequential order, where $n$ is an integer greater than one, each of said indicating circuits coupled to an input terminal of all other of said indicating circuits in said stages for providing control signals respectively thereto;

$n$ transfer-trap circuits alternatively operable in one of two stable states, said transfer-trap circuits each including an output terminal coupled to an input terminal of all of said indicating circuits except the next succeeding ordered indicating circuit, said output terminals being respectively coupled to an input circuit of the next sequential transfer-trap circuit, and each of said indicating circuits output terminals coupled to an input terminal of its associated transfer-trap circuit; and means for receiving time-space advance pulses coupled in common to a second input terminal of each of said transfer-trap circuits for causing one of said indicating circuits to switch to the indicating state only when the next preceding stage was in the indicating state for causing said preceding stage to be switched to the non-indicating state.

3. A circuit as in claim 2 wherein said transfer-trap circuit is composed of a pair of cross-coupled two-state logic circuits forming a bistable flip-flop.

4. A circuit as in claim 3 wherein said two-state logic circuits are transistor NOR circuits including diode logic input circuits.

5. An $n$-stage digital frequency divider circuit, each stage capable of alternatively generating indicating and non-indicating signals, the circuit operating at any given time so that only one of the $n$-stages generates an indicating signal and all other stages generate non-indicating signals, said circuit comprising:

$n$-indicating stages, where $n$ is an integer greater than one, said $n$-stages arranged in sequential order, each of said $n$-stages including three two-state logic circuits, each of said two-state logic circuits having multiple-input circuits and multiple-output circuits, a first of said logic circuits designated the indicating circuit, and a pair of said logic circuits designated transfer-trap control circuits, means for coupling a first output circuit of one of said pair of logic circuits to a first input circuit of the other logic circuit of said pair, means for coupling a first output circuit of the other of said pair of logic circuits to a first input circuit of said one logic circuit, means for coupling a second output circuit of said one logic circuit to a first input circuit of said indicating logic circuit, means for coupling a first output circuit of said indicating circuit to a second input circuit of said other logic circuit of said pair;

means for couplng a second output circuit of each of said indicating circuits respectively to a different input circuit of all other ones of said indicating circuits;

means for coupling a third output circuit of said one of said pair of logic circuits in each of said $n$-stages to a second input circuit of said one of said pair of logic circuits in the next subsequent stage;

means for coupling a fourth output circuit of said one of said pair of logic circuits in each of said $n$-stages respectively to a different input circuit of all other ones of said indicating circuits, except each of the next-sequential ones of said indicating circuits;

means for coupling an output circuit of at least one of said $n$-stage indicating circuits to a utilization device; and means for receiving a plurality of time-spaced advance pulses coupled to a third input circuit of said one of said pair of logic circuits in each of said $n$-stages, each of said advance pulses causing the indicating state of the indicating stage to propagate sequentially to the next sequential non-indicating stage and causing the previously indicating stage to become non-indicating.

6. A circuit as in claim 5 wherein each of said two-state logic circuits perform the NOR logical function.

7. A circuit as in claim 6 wherein each of said NOR logic circuits includes a transistor, a bias network coupled to said transistor for normally biasing said transistor into a first state of conduction, and a logic array of unidirectional current conducting means coupled to said biased network, the output signal derived from said transistor being dependent on the input signals applied to said logic array of unidirectional current conducting means.

8. A circuit as in claim 7 wherein $n$ equals 3.

9. An indicating stage for use in an $n$-stage pulse frequency divider circuit including a plurality of sequentially ordered similar stages, said stages in combinaton comprising:

an indicating logic circuit alternatively stably operable in an indicating and non-indicating state, said indicating logic circuit including an indicating output terminal and at lease $2(n-1)$ input terminals, where $n$ is an integer greater than one corresponding to the number of stages in the frequency divider circuit;

means for coupling said indicating output terminal to different respective input terminals of all other indicating circuits in the $n$-stage circuit;

a transfer-trap circuit alternatively switchable to one of two stable-states, said transfer-trap circuit including an advance terminal for receiving time-spaced advance pulses, at least two control terminals for receiving control signals, and a control output terminal, the state of said transfer-trap circuit determined by the combination of signals applied at said advance terminal and said control input terminal;

means coupling said indicating output terminal to one of said control input terminals;

means coupling said control output terminal to one of said input terminals of said indicating logic circuit for providing control signals for causing said indicating circuit to switch stable-states;

means for coupling said control output terminal to a second control input terminal of the transfer-trap circuit of the next sequential stage; and means for coupling said control output terminal to different respective input terminals of all other indicating circuits, except the next sequential stage indicating circuit.

10. A circuit as in claim 9 wherein each of said two-state logic circuits perform the NOR logical function.

11. A circuit as in claim 10 wherein each of said NOR logic circuits includes a transistor, a biased network coupled to said transistor for normally biasing said transistor into a first state of conduction, and a logic array of unidirectional current conducting means coupled to said biased network, the output signal derived from said transistor being dependent on the input signals applied to said logic array of unidirectional current conducting means.

12. An indicating stage for use in a signal stepping circuit comprised of a plurality of similar sequentially ordered stages, said stage comprising in combination:

a two-state logic circuit alternatively stably operable in indicating and non-indicating states, said logic circuit including an indicating output termnal and a plurality of input terminals for receiving input signals from the indicating output terminals of all other ones of similar logic circuits in the stepping circuit;

a transfer-trap circuit alternatively switchable to one of two stable-states, said transfer-trap circuit including at least two control terminals for receiving control signals and a control output terminal coupled to an input terminal of said logic circuit, said output terminal including circuit means for coupling to all subsequent ordered states, said transfer-trap circuit having one of said control input terminals adapted to receive a control pulse from the next preceding stage and the second control terminal coupled to said indicating output terminal, said transfer-trap circuit further including an advance terminal for receiving time-spaced advance pulses for causing said indicating circuit to switch to the indicating state only when the next preceding stage was in the indicating state and for causing said preceding stage to be switched to the non-indicating state and for inhibiting switching of said indicating circuit when said preceding stage was in the non-indicating state.

13. A circuit as in claim 12 wherein said transfer-trap circuit is comprised of a pair of cross-coupled two-state logic circuits forming a bistable flip-flop.

14. A circuit as in claim 13 wherein each of said two-state logic circuits comprises a NOR logic circuit, said NOR logic circuit including a transistor having a base electrode, an emitter electrode, and a collector electrode, one of said electrodes being designated the control electrode, and a second of said electrodes being designated the output electrode, and a third electrode being undesignated, a biased network comprised of resistors including means for serially coupling said biased network between first and second voltage sources, said biased network for biasing transistors into a first stable-state of conduction in the absence of any input signals, said biased network having first and second junction points, said first junction point coupled to said control electrode, a plurality of unidirectional current conduction means, each having first and second terminals, means for coupling like terminals of unidirectional current conducting means to said second junction point of said biased network, a plurality of means for receiving input signals, each of said means for receiving coupled to respective different ones of the other of said like terminals of said unidirectional current conduction conducting means, a limiting diode coupled between said output electrode and a source for receiving a third voltage level, means for coupling said undesignated electrode to a fourth voltage source, and load means coupled to the junction of the coupling of said output electrode and said limiting diode.

References Cited

UNITED STATES PATENTS

| | | | |
|---|---|---|---|
| 3,139,540 | 6/1964 | Osborne ___________ | 307—88.5 |
| 3,310,660 | 3/1967 | Gogar _____________ | 307—88.5 |

ARTHUR GAUSS, *Primary Examiner.*

S. D. MILLER, *Assistant Examiner.*

UNITED STATES PATENT OFFICE

CERTIFICATE OF CORRECTION

Patent No. 3,350,579 October 31, 1967

Richard M. Oman

It is hereby certified that error appears in the above numbered patent requiring correction and that the said Letters Patent should read as corrected below.

Column 11, line 3, for "tranfsfer-trap" read -- transfer-trap --; line 44, for "composed" read -- comprised --; line 73, for "couplng" read -- coupling --; column 13, line 9, for "termnal" read -- terminal --.

Signed and sealed this 4th day of February 1969.

(SEAL)

Attest:

Edward M. Fletcher, Jr.

Attesting Officer

EDWARD J. BRENNER

Commissioner of Patents